United States Patent [19]

Abe et al.

[11] Patent Number: 4,751,908
[45] Date of Patent: Jun. 21, 1988

[54] LEARNING CONTROL SYSTEM FOR CONTROLLING THE AIR-FUEL RATIO FOR AN AUTOMOTIVE ENGINE

[75] Inventors: Kunihiro Abe, Higashimurayama; Yoshitake Matsumura, Hachiouji; Takurou Morozumi, Mitaka, all of Japan

[73] Assignee: Fuji Jukogyo Kabushiki Kaisha, Tokyo, Japan

[21] Appl. No.: 85,219

[22] Filed: Aug. 11, 1987

Related U.S. Application Data

[63] Continuation of Ser. No. 757,543, Jul. 19, 1985, abandoned.

[30] Foreign Application Priority Data

Jul. 20, 1984 [JP] Japan .................................. 59-151781

[51] Int. Cl.⁴ ............................................. F02D 41/14
[52] U.S. Cl. ..................................... 123/489; 123/479

[58] Field of Search ............... 123/479, 486, 480, 489; 364/431.05, 431.11

[56] References Cited

U.S. PATENT DOCUMENTS

| | | | |
|---|---|---|---|
| 4,200,064 | 4/1980 | Engele | 123/489 |
| 4,309,971 | 1/1982 | Chiesa et al. | 123/480 |
| 4,408,584 | 10/1983 | Yabuhara et al. | 123/489 |
| 4,483,300 | 11/1984 | Hosaka et al. | 123/489 |

FOREIGN PATENT DOCUMENTS 60-45749 3/1985 Japan .................................. 123/489

*Primary Examiner*—Andrew M. Dolinar
*Attorney, Agent, or Firm*—Martin A. Farber

[57] ABSTRACT

A system for updating data stored in a table at a steady state of engine operation in accordance with a feedback signal. When during a predetermined period between a maximum value and a minimum value of the output voltage of an $O_2$-sensor is smaller than a predetermined limit value, the updating is stopped.

13 Claims, 6 Drawing Sheets

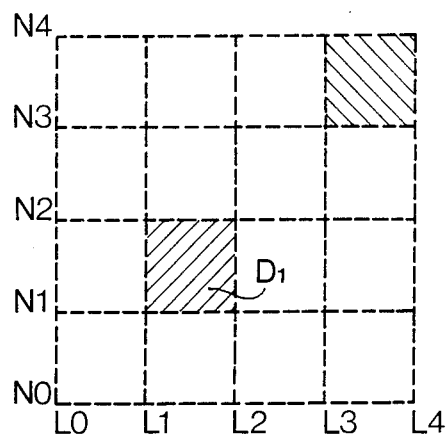
F I G. 3a
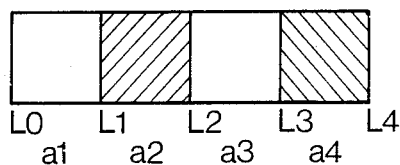
F I G. 3b
F I G. 4a
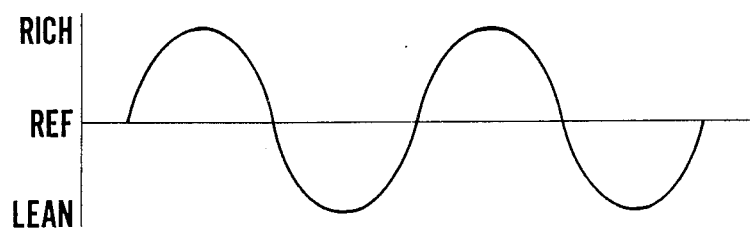
F I G. 4b
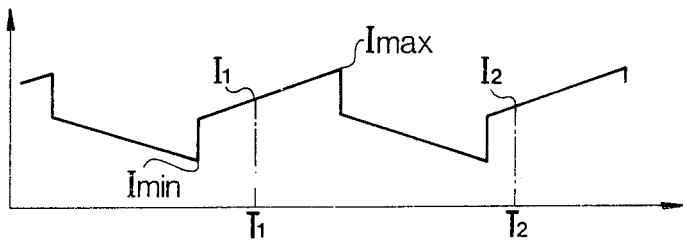

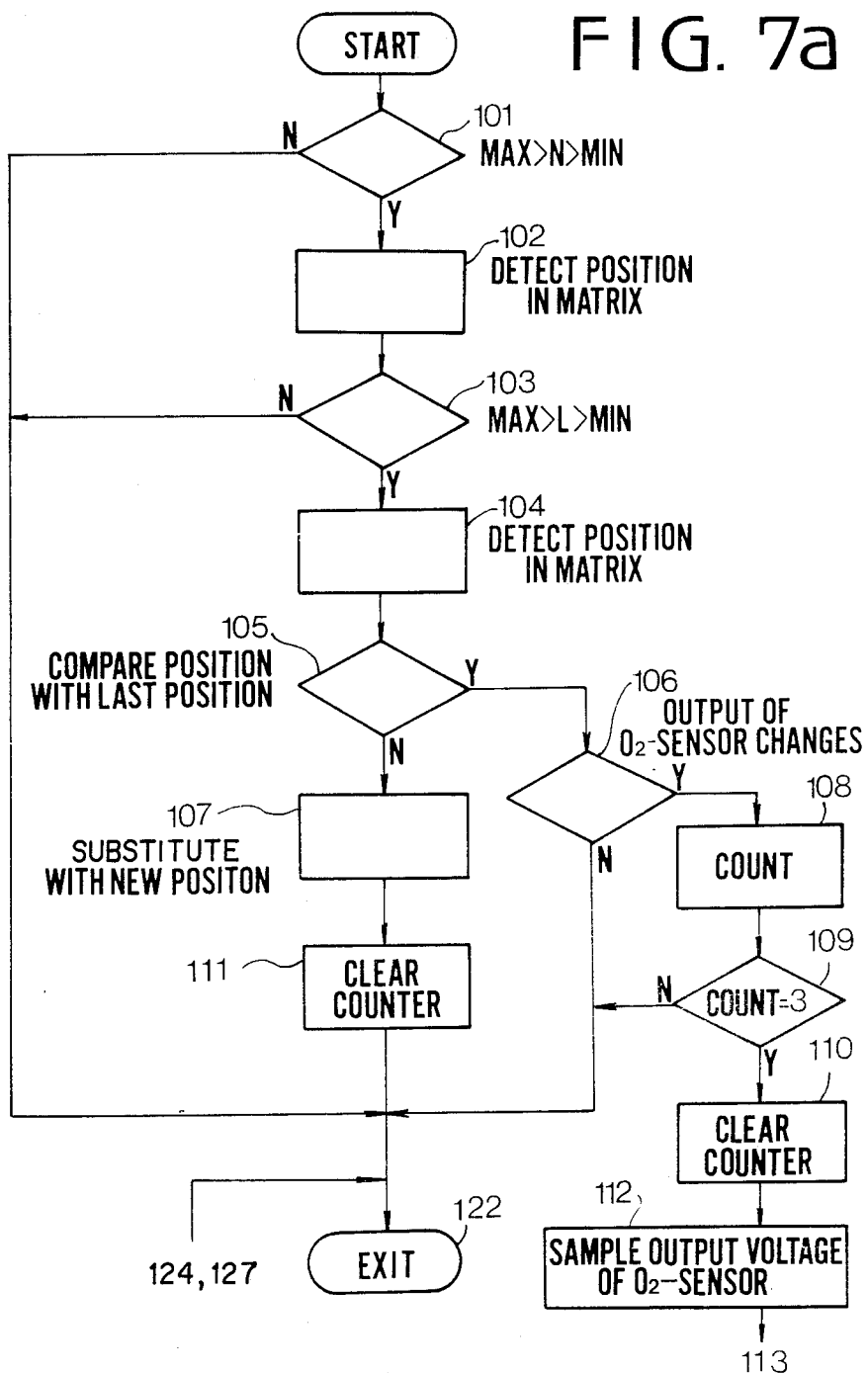

LEARNING CONTROL SYSTEM FOR CONTROLLING THE AIR-FUEL RATIO FOR AN AUTOMOTIVE ENGINE

RELATED APPLICATION

This application is a continuation of our application Ser. No. 757,543 filed July 19, 1985, now abandoned.

BACKGROUND OF THE INVENTION

The present invention relates to a system for controlling the air-fuel ratio of mixture for an automotive engine, and more particularly to a learning control system for updating data stored in a table so as to properly drive a motor vehicle.

In a learning control system, updating of data is performed with new data obtained during the steady state of engine operation. Accordingly, means for determining whether the engine operation is in the steady state is necessary. A conventional learning control system (for example U.S. Pat. No. 4,309,971) has a matrix (two-dimensional lattice) comprising a plurality of divisions, each representing engine operating variables such as engine speed and engine load. When the variables continue for a predetermined period of time in one of the divisions, it is determined that the engine is in the steady state. On the other hand, a three-dimensional look-up table is provided in which a matrix coincides with the matrix for determining the steady state. Data in the look-up table is updated with new data obtained during steady state.

In such an air-fuel ratio control system, if an $O_2$-sensor for obtaining information for updating data deteriorates, the difference between a maximum value and a minimum value of output voltage of the $O_2$-sensor decreases. When the difference in output voltage decreases, the system does not perform its function in providing proper data. Accordingly, the driveability of a vehicle decreases and fuel consumption increases.

SUMMARY OF THE INVENTION

The object of the present invention is to provide a system which may eliminate problems caused by the failure of an $O_2$-sensor.

In the system of the present invention, when the difference between a maximum value and minimum value of the output voltage of an $O_2$-sensor becomes smaller than predetermined value, the updating operation is stopped.

According to the present invention, there is provided a system for controlling the air-fuel ratio in an automotive engine by updated data, comprising a table storing data used for controling the operation of the engine and an $O_2$-sensor for producing an output voltage dependent on a constituent in exhaust gases of the engine, first means for updating the data in the table with a value relative to the output voltage, second means for detecting the difference between a maximum value and a minimum value of the output voltage during a predetermined period. The updating of the data is stopped, when the difference is smaller than a predetermined limit value.

The other objects and features of this invention will become understood from the following description with reference to the accompanying drawings.

BRIEF DESCRIPTION OF DRAWINGS

FIG. 3a is an illustration showing a matrix for detecting the steady state of engine operation;

FIG. 3b shows a table for learning control coefficients;

FIG. 4a shows the output voltage of an $O_2$-sensor;

FIG. 4b shows the output voltage of an integrator;

FIG. 7a and 7b are flowcharts showing the operation in an embodiment of the present invention.

DETAILED DESCRIPTION OF THE PREFERRED EMBODIMENT

Figure 1:
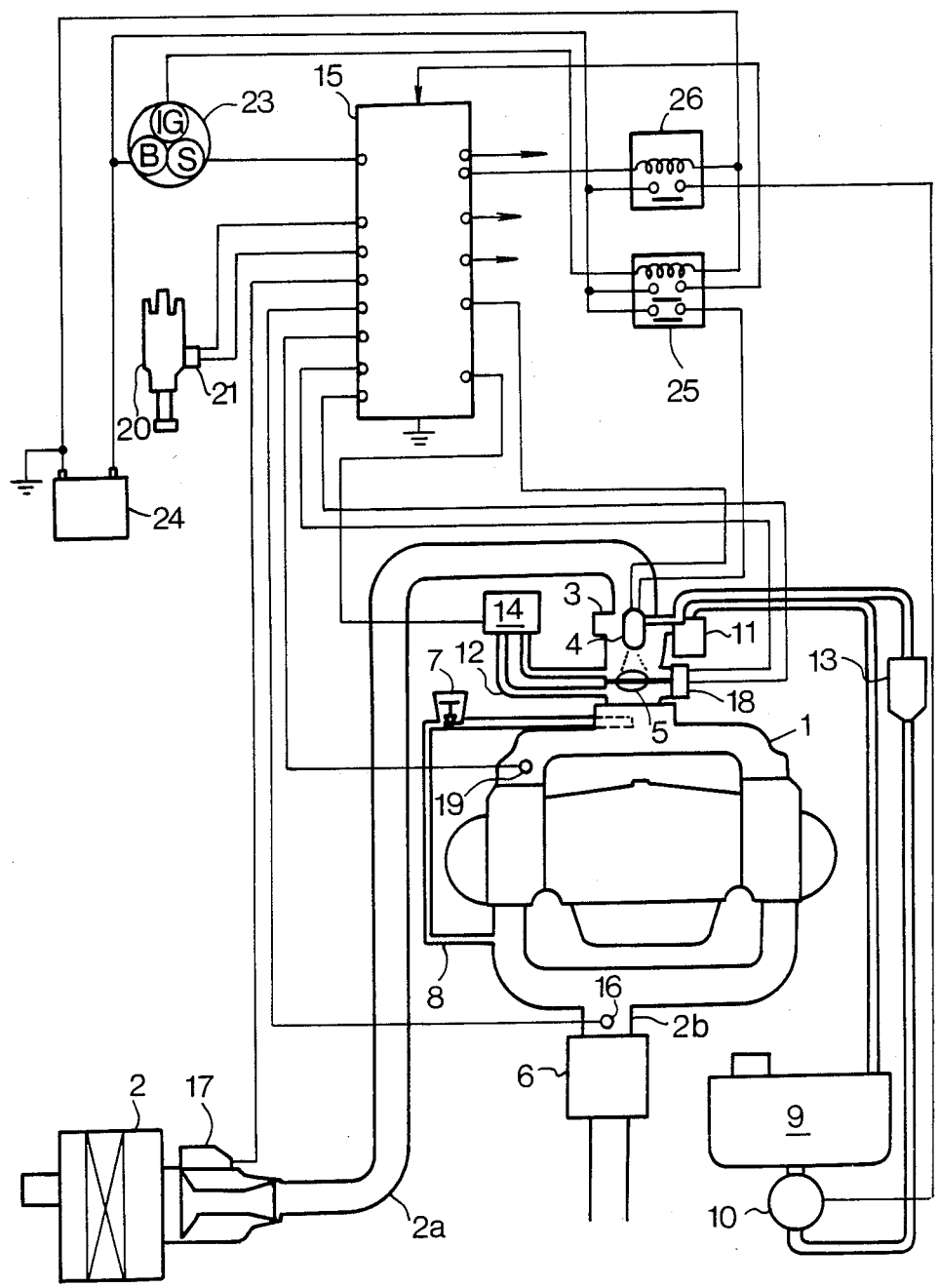
FIG. 1 is a schematic illustration showing a system for controlling the operation of an internal combustion engine for a motor vehicle.

Referring to FIG. 1, an internal combustion engine 1 for a motor vehicle is supplied with air through an air cleaner 2, intake pipe 2a, and throttle valve 5 in a throttle body 3, mixing with fuel injected from an injector 4. A three-way catalitic converter 6 and an $O_2$-sensor 16 are provided in an exhaust passage 2b. An exhaust gas recirculation (EGR) valve 7 is provided in an EGR passage 8 in a well-known manner.

Fuel in a fuel tank 9 is supplied to the injector 4 by a fuel pump 10 through a filter 13 and pressure regulator 11. A solenoid-operated valve 14 is provided in a bypass 12 around the throttle valve 5 so as to control engine speed at idling operation. A mass air flow meter 17 is provided on the intake pipe 2a and a throttle position sensor 18 is provided on the throttle body 3. A coolant temperature sensor 19 is mounted on the engine. Output signals of the meter 17 and sensors 18 and 19 are applied to a microcomputer 15. The microcomputer 15 is also applied with a crankangle signal from a crankangle sensor 21 mounted on a distributor 20 and a starter signal from a starter switch 23 which operates to turn electric current from a battery 24 on and off. The system is further provided with an injector relay 25 and a fuel pump relay 26 for operating the injector 4 and fuel pump 10.

Figure 2:
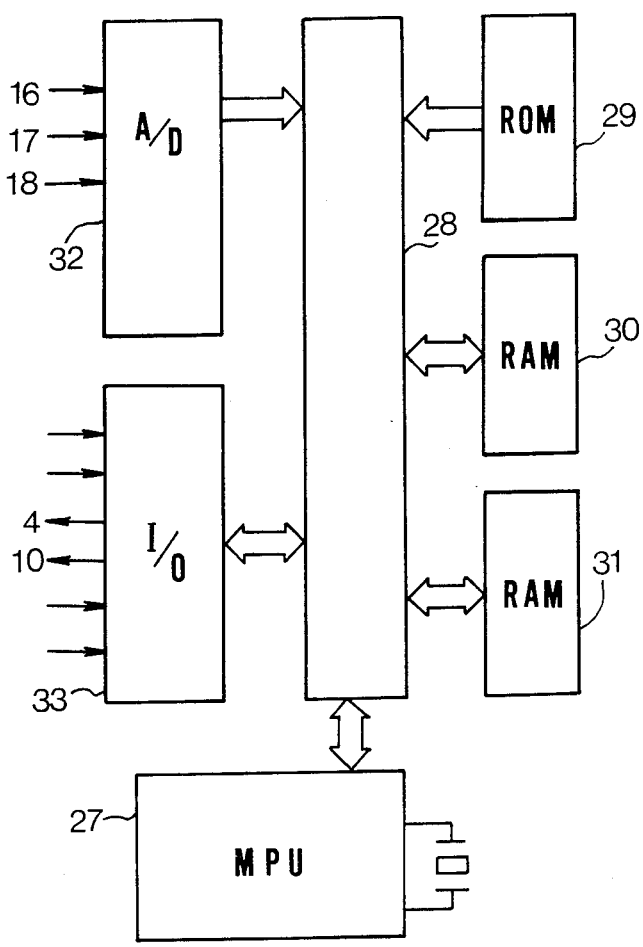
FIG. 2 is a block diagram of a microcomputer system used in a system of the present invention.

Referring to FIG. 2, the microcomputer 15 comprises a microprocessor unit 27, ROM 29, RAM 30, RAM 31 with back-up, A/D converter 32 and I/O interface 33. Output signals of the $O_2$-sensor 16, mass air flow meter 17 and throttle position sensor 18 are converted to digital signals and applied to the microprocessor unit 27 through a bus 28. Other signals are applied to the microprocessor unit 27 through I/O interface 33. The microprocessor manipulates the input signals and executes the hereinafter described process.

In the system, the amount of fuel to be injected by the injector 4 is determined in accordance with engine operating variables such as mass air flow, engine speed and engine load. The amount of fuel is determined by a fuel injector energization time (injection pulse width). Basic injection pulse width ($T_p$) can be obtained by the following formula.

$$T_p = K \times Q/N \qquad (1)$$

where Q is mass air flow, N is engine speed, and K is a constant.

Desired injection pulse width ($T_i$) is obtained by correcting the basic injection pulse ($T_p$) with engine operating variables. The following is an example of a formula for computing the desired injection pulse width.

$$T_i = T_p \times (COEF) \times \alpha \times K_a \qquad (2)$$

where COEF is a coefficient obtained by adding various correction or compensation coefficients such as coefficients of coolant temperature, full throttle open, engine load, etc., $\alpha$ is a $\lambda$ correcting coefficient (the integral of the feedback signal of the $O_2$-sensor 16), and $K_a$ is a correcting coefficient by learning (hereinafter called the learning control coefficient). Coefficients, such as the coolant temperature coefficient and engine load, are obtained by looking them up in tables in accordance with sensed information.

The learning control coefficients $K_a$ stored in a $K_a$-table are updated with data calculated during the steady state of engine operation. In the system, the steady state is recognized by engine operating conditions in predetermined ranges of engine load and engine speed and continuation of a detected state. FIG. 3a shows a matrix for the detection, which comprises, for example sixteen divisions defined by five row lines and five column lines. Magnitudes of engine load are set at five points $L_0$ to $L_4$ on the X axis, and magnitudes of engine speed are set at five points $N_0$ and $N_4$ on the Y axis. Thus, the engine load is divided into four ranges, that is $L_0$–$L_1$, $L_1$–$L_2$, $L_2$–$L_3$, and $L_3$–$L_4$. Similarly, the engine speed is divided into four ranges.

On the other hand, the output voltage of the $O_2$-sensor 16 cyclically changes through a reference voltage corresponding to a stoichiometric air-fuel ratio, as shown in FIG. 4a. Namely, the voltage changes between high and low voltages corresponding to rich and lean air-fuel mixtures. In the system, when the output voltage (feedback signal) of the $O_2$-sensor continues during three cycles within one of the sixteen divisions in the matrix, the engine is assumed to be in steady state.

FIG. 3b shows a $K_a$-table for storing the learning control coefficients $K_a$, which is included in the RAM 31 of FIG. 2. The $K_a$-table is a two-dimensional table and has addresses $a_1$, $a_2$, $a_3$, and $a_4$ which correspond to engine load ranges $L_0$–$L_1$, $L_1$–$L_2$, $L_2$–$L_3$, and $L_3$–$L_4$. All of the coefficients $K_a$ stored in the $K_a$-table are initially set to the same value, that is the numerical value "1". This is caused by the fact that the fuel supply system is to be designed to provide the most proper amount of fuel without the coefficient $K_a$. However, every automobile can not be manufactured to have a desired function resulting in the same results. Accordingly, the coefficient $K_a$ should be updated by experience for every automobile, when it is actually used.

Explaining the calculation of the injection pulse width ($T_i$ in formula 2) at starting of the engine, since the temperature of the body of the $O_2$-sensor 16 is low, the output voltage of the $O_2$-sensor is very low. In such a state, the system is adapted "1" as the value of the correcting coefficient $\alpha$. Thus, the computer calculates the injection pulse width ($T_i$) from mass air flow (Q), engine speed (N), (COEF), $\alpha$ and $K_a$. When the engine is warmed up and the $O_2$-sensor becomes activated, the integral of the output voltage of the $O_2$-sensor at a predetermined time is provided as the value of $\alpha$. More particularly, the computer has a function of an integrator, so that the output voltage of the $O_2$-sensor is integrated. FIG. 4b shows the output of the integrator. The system provides values of the integration at a predetermined interval (40ms). For example, in FIG. 4b, integrals $I_1$, $I_2$—at time $T_1$, $T_2$—are provided. Accordingly, the amount of fuel is controlled in accordance with the feedback signal from the $O_2$-sensor, which is represented by an integral.

Explaining the learning operation, when the steady state of engine operation is detected in one of the divisions of the matrix, data in a corresponding address of the $K_a$-table is updated with a value relative to the feedback signal from the $O_2$-sensor. The first updating is done with an arithmetical average (A) of maximum value and minimum value in one cycle of the integration, for example values of Imax and Imin of FIG. 4b. Thereafter, when the value of $\alpha$ is not 1, the $K_a$-table is incremented or decremented with a minimum value ($\Delta A$) which can be obtained in the computer. Namely one bit is added to or substracted from a BCD code representing the value A of the coefficient $K_a$ which has been rewritten at the first learning.

Figure 7B:
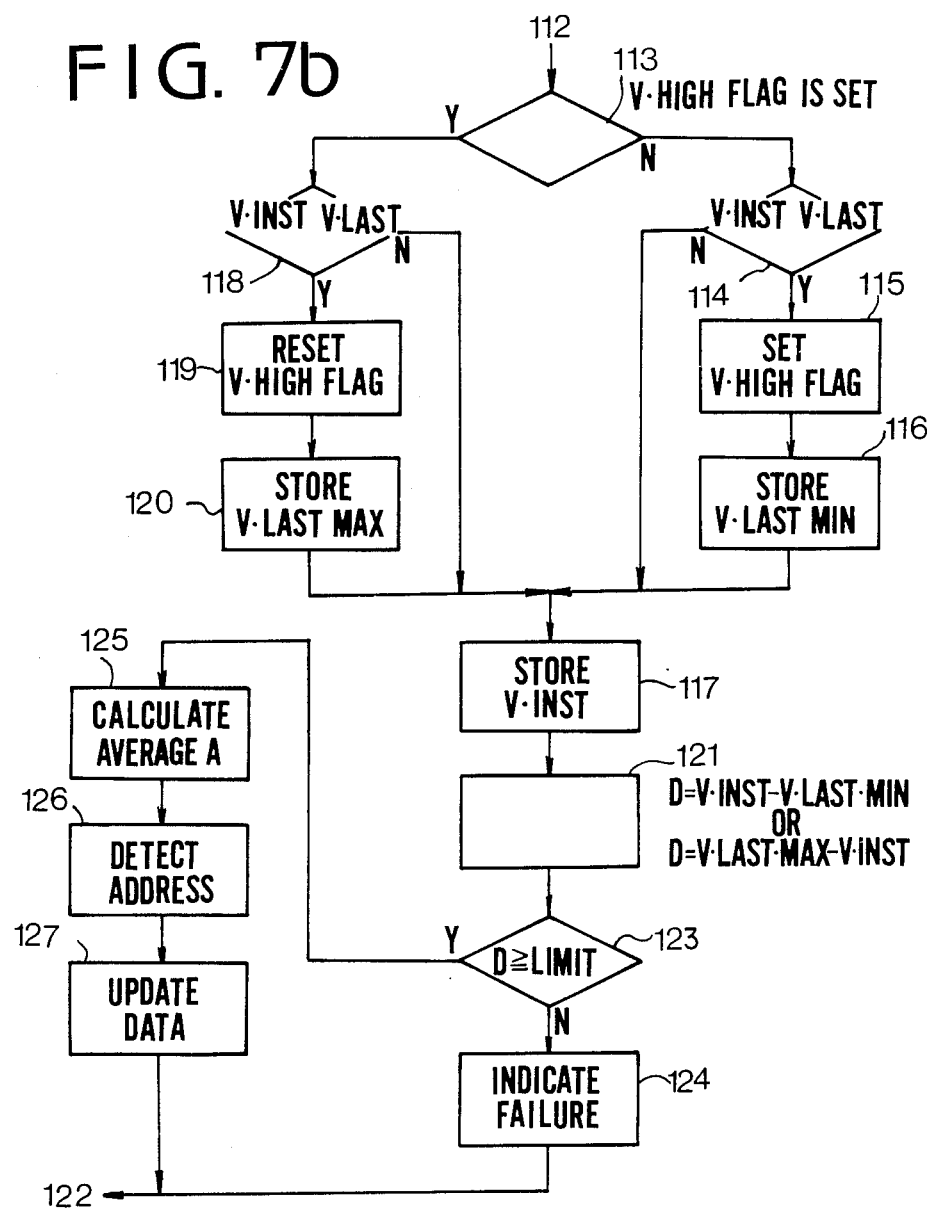

The operation of the system will be described in more detail with reference to FIG. 7. The learning program is started at a predetermined interval (40ms). Upon the first operation of the engine and the first time the motor vehicle is driven, engine speed is detected at step 101. If the engine speed is within the range between $N_0$ and $N_4$, the program proceeds to a step 102. If the engine speed is out of the range, the program exits the routine at a step 122. At step 102, the position of the row of the matrix of FIG. 3a in which the detected engine speed is included is detected and the position is stored in RAM 30. Thereafter, the program proceeds to a step 103, where engine load is detected. If the engine load is within the range between $L_0$ and $L_4$, the program proceeds to a step 104. If the engine load is out of the range, the program exits the routine. Thereafter, the position of the column corresponding the detected engine load is detected in the matrix, and the position is stored in the RAM. Thus, the position of the division corresponding to the engine operating condition represented by engine speed and engine load is determined in the matrix, for example, division $D_1$ is determined in FIG. 3a. The program advances to a step 105, where the decided position of the division is compared with the division which has been detected at the last learning. However, since the present learning is the first, the comparison can not be performed, and hence the program is terminated passing through steps 107 and 111. At the step 107, the position of the division $D_1$ is stored in RAM 30.

At the next learning after the first learning, the then detected position is compared with the last stored position of division $D_1$ at step 105. If the position of the division in the matrix is the same as the last learning, the program proceeds to a step 106, where the output voltage of the $O_2$-sensor 16 is detected. If the voltage changes from rich to lean and vice versa, the program goes to a step 108, and if not, the program is terminated. At the step 108, the number of cycles of the output voltage is counted by a counter. If the counter counts up to, for example three, the program proceeds to a step 110 from a step 109. If the count does not reach three, the program is terminated. At the step 110, the counter is cleared and the program proceeds to a step 112.

On the other hand, if the position of the division is not the same as the last learning, the program proceeds to step 107 from step 105, where the old data of the position is substituted with the new data. At the step 111, the counter which has operated at step 108 in the last learning is cleared. At step 112, the output voltage of the O₂-sensor at a predetermined interval of time is detected, in such a manner that, for example, voltage at a plurality of points in the positive-going excursion in one cycle of the output voltage are sampled. At a step 113, it is determined whether the voltage (V.LAST), detected at the last detection is greater than the voltage (V.BLAST) at the detection before the last detection. If the voltage (V.LAST) is greater than the voltage (V.BLAST), a flag (V.HIGH FLAG) is set, as described hereinafter. If the flag is not set, the program proceeds to a step 114 where the new voltage (V.INST) is compared with the old voltage (V.LAST). If the voltage (V.INST) is greater than the voltage (V.LAST), which means that the voltage (V.LAST) was a minimum value at the last cycle of the output voltage, the V.HIGH FLAG is set at a step 115. At a step 116, the voltage stored in a work memory is substituted with the old voltage (V.LAST) as a minimum value (V.LAST.MIN). Thereafter, the program advances to a step 117. If the V.INST is smaller than the V.LAST, the program proceeds from step 114 to step 117 without setting the flag.

If the flag exists at step 113, the program proceeds to a step 118 where it is determined whether the voltage (V.INST) is smaller than old voltage (V.LAST). If the voltage (V.INST) is smaller than V.LAST, the program proceeds to a step 119 where the flag (V.HIGH FLAG) is reset. At a step 120, the old voltage (V.LAST) is stored in the work memory as a maximum value (V.LAST MAX).

Figure 5:
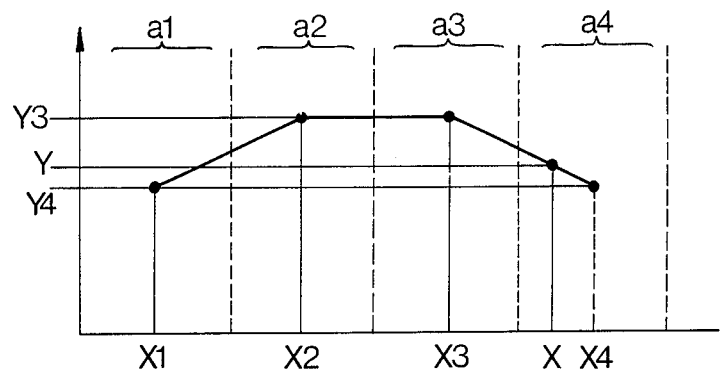
FIG. 5 shows a linear interpolation for reading the table of FIG. 3b.

At step 117, the voltage (V.INST) is stored in the work memory as an old voltage (V.LAST), which will be the old voltage at step 116 or 120 at the next program. At step 121, if the flag (V.HIGH FLAG) is set at step 115, the voltage (V.LAST.MIN) at step 116 is subtracted from the voltage (V.INST). If no flag exists, the voltage (V.INST) is subtracted from the voltage (V.LAST.MAX). Thus, the difference D obtained at step 121 may be regarded as the difference between a maximum value and a minimum value. At a step 123, the FIG. 5 shows an interpolation of the $K_a$-table. At engine loads $X_1$, $X_2$, $X_3$, and $X_4$, updated value $Y_3$ and $Y_4$ (as coefficient K) are stored. When the detected engine load does not coincide with the set loads $X_1$ to $X_4$, coefficient the $K_a$ is obtained by linear interpolation. For example, the value Y of $K_a$ at engine load X is obtained by the following formula.

$$Y = ((X-X_3)/(X_4-X_3)) \times (Y_4-Y_3) + Y_3$$

Figure 6A:
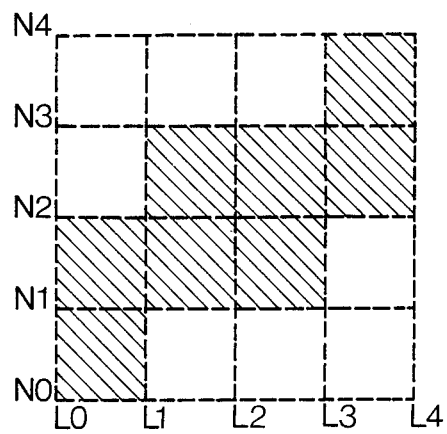
FIGS. 6a and 6b are illustrations for explaining probability of updating.
Figure 6B:
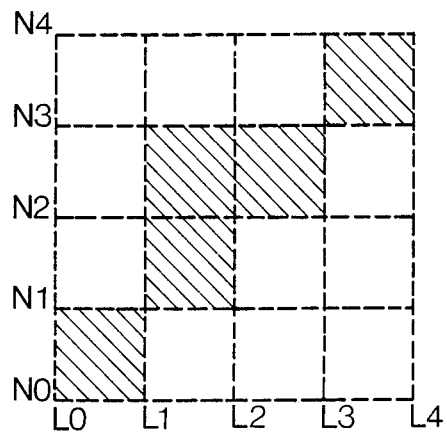

FIG. 6a is a matrix pattern showing the updating probability over 50% and FIG. 6b is a pattern showing the probability over 70% by hatching divisions in the matrix. More particularly, in the hatched range in FIG. 6b, the updating occurs at a probability over 70%. From the figures, it will be seen that the updating probability at extreme engine operating steady states, such as the state at low engine load at high engine speed and at high engine load at low engine speed, is very small. In addition, it is experienced that the difference between the values of coefficient $K_a$ in adjacent speed ranges is small. Accordingly, it will be understood that the two-dimensional table, in which a single data is stored at each address, is sufficient for performing the learning control of an engine.

Thus, in accordance with the present invention, the failure of an O₂-sensor is detected and writing of improper data can be prevented, avoiding proper engine operation, until the failure is repaired.

While the presently perferred embodiment of the present invention has been shown and described, it is to be understood that this disclosure is for the purpose of illustration and that various changes and modifications may be made without departing from the scope of the invention as set forth in the appended claims.

We claim:

1. A system for updating data of an apparatus for controlling air-fuel ratio in an automotive engine by the updated data, comprising:
    a look-up table storing data;
    an O₂-sensor for producing an output voltage dependent on a constituent in exhaust gases of the engine with respect to a reference value corresponding to a stoichiometric air-fuel ratio;

3. The system according to claim 2 wherein the first means performs the updating when the fifth means does not produce the signal.

4. The system according to claim 1, wherein
said difference being smaller than a predetermined limit value corresponds to failure of said $O_2$-sensor.

5. The system according to claim 1, wherein
said first means performs said updating of the data in the look-up table during steady state operation of the engine.

6. The system according to claim 1, wherein
said apparatus controls the air-fuel ratio in the automotive engine by previous of the updated data when said fifth means stops the updating when said difference is smaller than said predetermined limit value.

7. The system according to claim 6, wherein
said previous of the updated data is a most recent previous of the updated data.

8. The system according to claim 1, wherein
said first, second and third means perform said detections periodically.

9. A system according to claim 1, wherein
said maximum and minimum values, respectively are detected by said second and said third means respectively by periodically detecting the output voltage in said one cycle at a plurality of points of detection of the output voltage and comparing increases and decreases respectively of the points of the output voltage with respect to a last voltage detected and a last voltage detected before the last voltage detected.

10. The system according to claim 9, wherein
said second and said third means respectively determines said last voltage detected as the maximum and minimum values, respectively, when the output voltage of an instantaneous point of voltage being detected reverses its direction of change with respect to the last voltage detected compared to the direction of change of the last voltage detected from said last voltage detected before the last voltage detected.

11. The system according to claim 9, wherein
said plurality of points are three in respective halves of said cycle for detecting the maximum value and the minimum value, respectively.

12. A system for controlling an automotive engine by updated data, comprising:
a table storing data which is used for controlling operation of the engine;
a sensor for detecting operating condition of the engine and for producing a feedback signal dependent on the condition with respect to a reference value corresponding to a stoichiometric air-fuel ratio;
first means for detecting steady state of the engine operation and for producing a first signal;
second means responsive to said first signal for updating the data in the table with a value corresponding to the feedback signal;
third means for detecting a maximum value of the feedback signal of the sensor in a zone of the feedback signal having a larger value than the reference value corresponding to the stoichiometric air-fuel ratio in one cycle of the feedback signal of the sensor;
fourth means for detecting a minimum value of the feedback signal of the sensor in a zone of the feedback signal having a smaller value than the reference value corresponding to the stoichiometric air-fuel ratio in said one cycle;
fifth means for detecting the difference beween the maximum value and the minimum value of the feedback signal; and
sixth means for stopping said updating whenever the difference is smaller than a predetermined limit value, such that the system controls the engine by previous of the updated data.

13. A system for controlling an automotive engine by updated data, comprising:
a table storing data which is used for controlling operation of the engine;
first means for detecting operating condition of the engine and for producing a feedback signal dependent on the condition with respect to a reference value corresponding to a stoichiometric air-fuel ratio;
second means for updating the data in the table with a value corresponding to the feedback signal;
third means for detecting a maximum value of the feedback signal of the first means in a zone of the feedback signal having a larger value than the reference value corresponding to the stoichiometric air-fuel ratio in one cycle of the feedback signal of the first means sensor;
fourth means for detecting a minimum value of the feedback signal of the sensor in a zone of the feedback signal having a smaller value than the reference value corresponding to the stoichiometric air-fuel ratio in said one cycle.

* * * * *